United States Patent Office 3,197,444
Patented July 27, 1965

3,197,444
THERMALLY STABLE POLYAMIDES FROM SUBSTITUTED AROMATIC DIALKANOIC ACIDS
Frank B. Moody, West Chester, Pa., assignor to E. I. du Pont de Nemours and Company, Wilmington, Del., a corporation of Delaware
No Drawing. Filed July 13, 1960, Ser. No. 42,491
3 Claims. (Cl. 260—78)

This invention relates to new and useful synthetic polymers. More particularly, it relates to a novel class of high molecular weight polyamides which exhibit enhanced melting points, and which may be formed into shaped structures of great utility.

Polyamides have been known for many years, several members of this class of polymeric substances having achieved wide commercial significance. These known polyamides have been largely those derived from aliphatic dicarboxylic acids and diamines, but have also been prepared from dicarboxylic acids and/or diamines containing aromatic nuclei, aromatic di-primary metadiamines and aliphatic, aromatic, or aliphatic-aromatic dicarboxylic acids, and from aliphatic, aromatic, or aliphatic-aromatic diamines and dinitriles.

It has long been a goal in the preparation of synthetic fiber-forming polymers to provide products having greater stability at elevated temperatures and increased melting points. The introduction of these properties gives the polymers wider utility in those uses which require the application of elevated temperatures, as, for example, as press cloths in commercial and home laundering, etc.

It is an object of this invention to produce a novel class of high molecular weight polyamides formable into filaments and films. It is a further object of this invention to produce high molecular weight polyamides having enhanced melting points. It is a still further object of this invention to produce high molecular weight polyamides having enhanced melting points and characterized by the presence of specifically substituted aromatic nuclei within the polymer chain.

These polyamides are prepared in accordance with this invention by reacting diamines with nuclearly substituted aromatic or aliphatic-aromatic dicarboxylic acids whose aromatic nuclei bear substitutents in specific positions as herein described, and are characterized by melting points which are substantially higher than the observed melting points for polyamides formed by the reaction of the same diamines with the same aromatic or aliphatic-aromatic dicarboxylic acids, but which are not nuclearly substituted.

In accordance with this invention, there is provided a class of high molecular weight polyamides comprising recurring structural units of the formula:

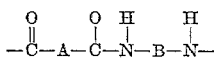

wherein "A" is a divalent aromatic or aliphatic-aromatic organic radical, with chain-extending bonds oriented meta or para to one another, which bears one or more symmetrically placed substituents whose point of attachment to the aromatic nucleus is ortho to the chain-extending bonds, or a mixture of radicals, at least 70% being of the type described above, the remainder of which may be aliphatic or unsubstituted aromatic or aliphatic-aromatic radicals; and wherein "B" is one or more divalent aliphatic, aromatic, or aliphatic-aromatic organic radicals; a sufficient number of said units recurring so as to provide a film and fiber-forming polymer.

By "chain-extending bonds," it is meant the two unsaturated valence bonds of the divalent aromatic or aliphatic-aromatic radical. These valence bonds may be extended directly from the aromatic nucleus, as would be evidenced by a meta- or para-phenylene radical, or they may be extended from carbon atoms attached to the nucleus, as would be evidenced by a meta- or para-bis(methylene) benzene radical or by a meta- or para-bis(ethylene)benzene radical.

For a fiber-forming polymer of particularly enhanced melting point, the divalent nuclearly substituted aromatic or aliphatic-aromatic radical defined as "A" above is preferably one of the following radicals:

(a)

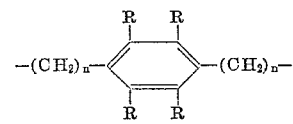

wherein $n$ is an integer having the value 0, 1, or 2, and R is a member of the group of lower alkyl, halogen, or other simple, non-amide-forming substituent; or (b)

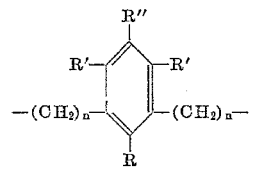

wherein $n$ is an integer having the value 0, 1, or 2, and R, R' and R" are so chosen that the requirements as set forth in one of the following three definitions are met: (1) R represents a simple, non-amide-forming substituent as defined in (a) above, R' represents a hydrogen atom, and R" represents either a hydrogen atom or a simple, non-amide-forming substituent; (2) R reprsents a hydrogen atom, R' represents a simple, non-amide-forming substituent, and R" represents either a hydrogen atom or a simple, non-amide-forming substituent; or (3) R and R' represent simple, non-amide-forming substituents, and R" represents either a hydrogen atom or a simple, non-amide-forming substituent.

The organic radicals, which are designated as "A" above, possess aromatic nuclei to which are attached the functional carboxyl groups, with or without one or two intervening methylene units, and to which are bonded nuclear substituents, such that when the chain-extending bonds are oriented para to one another, all ortho positions, and hence all nuclear positions, are substituted by groups other than hydrogen. When the chain-extending bonds are oriented meta to one another, there are necessarily present one, two, or three substituents symmetrically placed relative to the chain-extending bonds and ortho to each of them as, for example, one substituent located between the chain-extending bonds; two substituents, each ortho to only one of the chain-extending bonds; or three substituents, one ortho to each of the chain-extending bonds and one located between them and ortho to both. There may also be present, when the chain-extending bonds are oriented meta to one another, an additional substituent meta to both of the bonds, but this substituent is not necessary and imparts no additional enhancement to the melting point.

The functional carboxyl groups may be attached to the substituted aromatic nucleus or separated from it by no more than two methylene units. Separation of the carboxyl groups from the ring by no more than two atoms makes possible the formation of polyamides exhibiting enhanced melting points, while separation by three or more such methylene units fails to give the desired enhancement. That the effect of nuclear substituents is noted through an aliphatic chain of this length is quite surprising.

The functional carboxyl groups may be attached to the nuclear substituents are symmetrically placed relative to the chain-extending bonds. By this is meant that the aromatic nucleus is so substituted that a line normal to the polymeric chain through the nucleus divides the dicarboxylic acid radical into similar halves. This may be further explained with reference to structure diagrams (1) and (2), below:

(1) 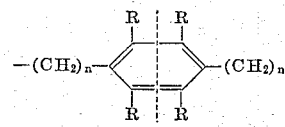

(2) 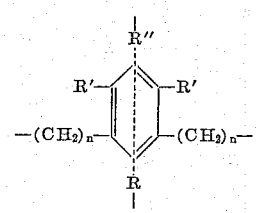

For symmetry to be present in (1), there are four nuclear substituents, while for symmetry in (2) both groups designated as R' are of the same type, i.e., whether both positions are occupied by hydrogen atoms or by substituents other than hydrogen, the spatial requirements of the two groups must be similar. Regardless of the nature of R and R", the radical may be symmetrical, but if one nuclear substituent designated as R' differs appreciably from the other R' in spatial requirements, symmetry is not possible.

The high molecular weight polymers of this invention are prepared by reacting an organic diamine with a dicarboxylic acid, or its amide-forming derivatives, said acid being characterized by having an aromatic nucleus bearing symmetrically placed ortho-substituents as herein defined, and having the chain-extending bonds, through which the carboxyl groups are bonded with or without one or two intervening methylene units, oriented meta or para to one another.

Among the dicarboxylic acids containing non-amide-forming substituents which may be utilized in this invention are: 2-methylisophthalic acid; 4,6 - dimethylisophthalic acid; 2,4,6-trimethylisophthalic acid; 2,4,5,6-tetramethylisophthalic acid; 2,3,5,6 - tetramethylterephthalic acid; 2-methyl-m-phenylenediacetic acid; 4,6-dimethyl-m-phenylene diacetic acid; 2,4,6 - trimethyl-m-phenylenediacetic acid; 2,4,5,6-tetramethyl-m-phenylenediacetic acid; 2,3,5,6-tetramethyl-p-phenylenediacetic acid; 2-methyl-m-benzenedipropionic acid; 4,6-dimethyl-m-benzenedipropionic acid; 2,4,6-trimethyl-m-benzenedipropionic acid; 2,4,5,6 - tetramethyl-m-benzenedipropionic acid; and 2,3,5,6-tetramethyl-p-benzenedipropionic acid.

One or more of the positions occupied by methyl groups may be occupied by other lower alkyl groups, such as ethyl or isopropyl, as, for example, in 2-ethylisophthalic acid; 2-methyl - 4,6 - diethylisophthalic acid; 4,6-diisopropylisophthalic acid; or 2,5-dimethyl-4,6-diisopropylisophthalic acid, to name only a few of the possible dicarboxylic acids of this type. One or more of the methyl groups may also be replaced in a similar manner by halogen groups, such as chloro, bromo, or iodo, e.g., 4,6-dichloro-m-phenylenediacetic acid or 2,4,6 - tribromoisophthalic acid. Other types of substituents which may replace one or more of the methyl groups are lower alkoxy groups as methoxy, ethoxy, etc.; nitro groups; nitrile groups; or any other simple substituent which is not reactive under the conditions of condensation. Amide-forming derivatives of these acids are suitable according to this invention and include the acid halides (as 2-methyl-isophthaloyl chloride, 4,6-diethylisophthaloyl chloride, etc.), the alkyl or aryl diesters (as the methyl, ethyl, or benzyl diesters), or the amides (as 2-isopropylisophthalamide).

Suitable diamines include aliphatic diamines, as ethylenediamine, propylenediamine, tetramethylenediamine, pentamethylenediamine, hexamethylenediamine, heptamethylenediamine, octamethylenediamine, nonamethylenediamine, decamethylenediamine, and other higher members of this series. Branched aliphatic diamines as, for example, 2-methyl-1,6-diaminohexane, or 3-methyl-1,7-diaminoheptane may be used in the preparation of the polymers of this invention. The cycloaliphatic diamines, as, e.g., cyclohexanediamine, and aliphatic heterocyclic diamines as, e.g., piperazine, are also suitable for use in the preparation of the polyamides of this invention. Other diamines which are of utility are m-phenylenediamine, p-phenylenediamine, and nuclearly substituted members of these classes, as 2-ethyl-m-phenylenediamine, or 2,3,5,6 - tetramethyl-p-phenylenediamine. A further class of diamines which is useful in this invention comprises m-xylylenediamine, p-xylylenediamine, and such nuclearly substituted xylylenediamines as 4,6 - dimethyl-m-xylylenediamine, 2-chloro-m-xylylenediamine and 2,3,5,6-tetraethyl-p-xylylenediamine.

The high melting polyamides of this invention may be prepared in accordance with any method which has been previously described as of utility in the manufacture of polymers of this type. Probably the most extensively used method has been that of melt polymerization, one embodiment of which may be found in U.S. Patent 2,244,192, which describes the preparation of polyamides by a process involving melting the components together and maintaining the polymerizing mixture at elevated temperatures for extending periods of time. Another embodiment of this type of polymerization involves the use of a salt of the diamine and the dicarboxylic acid in order to insure that the polymerizing mixture will contain equivalent amounts of the two components. In either embodiment, however, the diamine and dicarboxylic acid are reacted by maintaining them at an elevated temperature, generally above 200° C., for an extended period of time, ranging from about 1 hour upwards, until polymerization has proceeded to such an extent that a polymer of film or fiber-forming molecular weight is provided.

Another procedure for the preparation of polyamides is interfacial polymerization, such as is described in U.S. Patent 2,831,834. By this method the diamine and dicarboxylic acid or a derivative thereof are in separate phases which are immiscible with one another, and which are combined with rapid stirring to insure thorough mixing. The polymerization reaction takes place at the interfaces between the two phases. This method generally involves no elevated temperatures and may be carried out at room temperature. The dicarboxylic acid is generally present in the form of its acid chloride, so that the reaction proceeds quite rapidly. Any other method of polymerization which yields polyamides, as, for example, solution polymerization, may be used with equal success in the preparation of the polymers of this invention.

Example 1

Hexamethylene diamine in the amount of 5.80 grams and 12.4 grams of sodium carbonate monohydrate are dissolved in 100 grams of water at 0° C. in a Waring Blender. To the rapidly stirred solution is added a solution of 10.85 grams of 2-methylisophthaloyl chloride in 88 grams of benzene, the addition being complete within ½ minute. Polymerization takes place rapidly, forming a white solid which is removed by filtration. The poly(hexamethylene 2 - methylisophthalamide) thus formed is washed successively with water, acetone, and methanol, and dried. It is found to melt at 337° C. Poly(hexamethylene isophthalamide), prepared in an analogous manner, has a melting point of 243° C.

Example II

Hexamethylene diamine in the amount of 3.93 grams, 6.27 grams of 4,6-dimethylisophthalic acid, and 40 grams of water are heated at the temperature of reflux until solution is effected. Upon cooling and dilution of the solution with twice its volume of isopropyl alcohol, the precipitated hexamethylene diammonium 4,6-dimethyl-isophthalate is filtered, washed, and dried. An admixture of 4.5 grams of the white crystalline salt, which melts at 260° C., and 6 grams of phenol are placed in a reaction tube. The tube is alternately evacuated and flushed with nitrogen to remove traces of air, and is finally evacuated and sealed. After being heated in an air bath for 1½ hours at a temperature of 215° C., the tube is cooled and opened. While passing in a slow stream of nitrogen, the tube is heated by immersion in a vapor bath for 10 minutes at a temperature of 259° C., during which time the phenol distills from the reaction mixture, for a further 15 minutes at a temperature of 275° C., and for 5 minutes at a temperature of 305° C. The resulting polymer is then removed from the tube, and found to have a melting point of 325° C. This is 82° higher than the melting point of poly(hexamethylene isophthalamide), prepared in the same manner and differing only in the absence of the two methyl groups ortho to the chain-extending bonds, which exhibits a melting point of 243° C.

Example III

Into 30 milliliters of absolute ethanol are dissolved 3.5 grams of 2,4,6-trimethyl-m-phenylenediacetic acid. To this stirred solution is added 1.81 grams of hexamethylene diamine dissolved in 20 grams of absolute ethanol. Crystallization of the resulting hexamethylene diammonium 2,4,6-trimethyl-m-phenylenediacetate is rapid. The mixture is allowed to stand for one hour, following the addition of 30 grams of diethyl ether, then is filtered, washed, and dried. 4.5 grams of the product, whose melting point is 240° C., are placed in a reaction tube with 4 grams of phenol. Following successive evacuation and flushing with nitrogen to remove traces of air, the tube is evacuated and sealed. The reaction mixture is heated by means of an air bath at a temperature of 215° C. for one hour, and allowed to cool prior to opening. While blanketed with nitrogen, the mixture is heated by means of a vapor bath to a temperature of 275° C. for one hour at atmospheric pressure, and for a like period in the same vapor bath under vacuum. The resulting poly(hexamethylene 2,4,6-trimethyl-m-phenylenediacetamide) exhibits a melting point of 310° C., while poly(hexamethylene-m-phenylenediacetamide) melts at 237° C.

Example IV

Five grams of hexamethylene diammonium 2,4,6-trimethyl-m-benzenedipropionate, prepared from the corresponding diamine and dicarboxylic acid by a procedure similar to those described in Example II or Example III, are placed in a reaction tube. The tube is alternately evacuated and purged with nitrogen, and is then evacuated and sealed. It is heated for one hour at a temperature of 215° C. by means of an air bath, cooled and opened. While blanketing the reaction mixture with nitrogen, the tube is heated by means of a vapor bath for ten minutes at a temperature of 275° C., for 20 minutes at a temperature of 285° C. at atmospheric pressure, and a further 10 minutes at the same temperature under vacuum. The resulting clear polymer exhibits a melting point of 275° C. while the corresponding polyamide, which bears no nuclear substituents, i.e. poly(hexamethylene-m-benzenedipropionamide), melts at 200° C.

Poly(hexamethylene 2,4,6 - trimethyl - m - benzenedibutyramide) prepared in a similar manner melts at 130° C., 20° lower than the corresponding polyamide which bears no nuclear substituents, i.e., poly(hexamethylene-m-benzenedibutyramide).

Poly(hexamethylene 2,4,6-trimethyl-m-benzenedipropionamide) forms a filament when the surface of the molten polymer is touched with a glass rod which is then withdrawn. The filament thus formed exhibits the phenomenon of cold drawing and a film cast from a solution of the polymer is tough and transparent.

Example V

The salt of hexamethylene diamine with 2,3,5,6-tetramethyl-p-benzenedipropionic acid in an amount of 3.5 grams, formed by a method analogous to that described in Example II or in Example III, and 5 grams of phenol are placed in a reaction tube. The tube is sealed after successive evacuation and flushing with nitrogen to remove air, and is heated by means of an air bath at a temperature of 215° C. for a period of one hour. The reaction tube is cooled, opened, and a slow stream of nitrogen is introduced thereto. By means of a vapor bath, the reaction mixture is heated for 5 minutes at a temperature of 275° C., for 10 minutes at a temperature of 285° C., for 10 minutes at a temperature of 305° C., and for 40 minutes at a temperature of 325° C. The resulting white polymer produced exhibits a melting point of 365° C., which is 85° higher than the 280° C. melting point of poly(hexamethylene p-benzenedipropionamide), the corresponding polyamide which bears no nuclear substituents.

Example VI

Seven grams of the salt of m-xylylene diamine with 2,4,6-trimethyl-m-benzenedipropionic acid, formed by a method analogous to that described in Example II or Example III are placed in a reaction tube. Following alternate evacuation and purging of the tube with nitrogen, it is evacuated, sealed, and heated in an air bath at a temperature of 215° C. for a period of 1½ hours. After cooling, the tube is opened, and a slow stream of nitrogen introduced to blanket the reaction mixture. By means of a vapor bath, the tube is heated to a temperature of 259° C. for 5 minutes, to a temperature of 275° C. for 10 minutes, to a temperature of 285° C. for 15 minutes, and to a temperature of 305° C. for 45 minutes. The resulting polymer, which could be melt-pressed to form a tough, transparent film, exhibited a melting point of 293° C., 75° higher than the corresponding polyamide which bears no nuclear substituents, whose melting point is 218° C.

Example VII

Decamethylene diammonium 4,6-dimethylisophthalate, formed by a procedure similar to those described in Example II and Example III, in the amount of 5 grams is added to 5 ml. of phenol in a reaction tube. The tube is alternately evacuated and flushed with nitrogen, then is evacuated and sealed. The mixture is heated in an air bath to a temperature of 215° C. for one hour and 20 minutes, and is then allowed to cool prior to the opening of the tube. A blanket of nitrogen is introduced to the mixture, and a vapor bath is used to heat the tube and its contents for 35 minutes at a temperature of 275° C. at atmospheric pressure and for 1 hour at the same temperature under vacuum. The resulting tough, transparent polymer melts at 241° C., which is 57° higher than the 194° C. melting point of poly(decamethylene isophthalamide), i.e., the corresponding polyamide which bears no nuclear substitutents.

The polymer of this example forms a filament from the melt when a glass rod is touched to the surface and withdrawn. A melt-pressed film prepared from the polymer is transparent and tough.

Example VIII

A procedure analogous to those described in Example II and in Example III is used in the preparation of the salt of 2,4,6-trimethyl-m-xylylene diamine and 2,4,6-trimethyl-m-benzenedipropionic acid. Six grams of this salt are placed in a tube, which is alternately evacuated and flushed with nitrogen to remove traces of air, and is then evacuated and sealed. The sealed tube is heated by means of a salt bath to a temperature of 215° C. for 20 minutes, to a temperature of 225° C. for 15 minutes, and to a temperature of 232° C. for 35 minutes. During this time, the polymerizing mixture becomes partially melted and then resolidifies. The tube is cooled and opened and its contents blanketed with nitrogen gas while heated, by means of a vapor bath, to a temperature of 265° C., for 5 minutes, to a temperature of 275° C. for 25 minutes, to a temperature of 283° C. for 10 minutes, to a temperature of 305° C. for 15 minutes, and to a temperature of 325° C. for 10 minutes. During this time, the polymer does not melt, and is subsequently observed to have a polymer melt temperature of 360° C.

The polyamides of this invention are useful in the form of shaped structures of various kinds. Particularly valuable are films and filaments formed from these high melting polymers. Because of their enhanced melting points and their resistance to degradation at elevated temperatures, they may be employed in many applications which involve these higher temperatures. The filaments, for example, may be used in press cloths for commercial and home laundering, where ironing temperatures are a factor of importance, in protective clothing, high temperature insulation, and filtration media, to name only a few of the possible fields in which these polyamides may find utility.

I claim:

1. A novel high molecular weight polyamide consisting essentially of repeating units having the following structural formula:

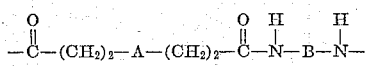

wherein A is selected from the group consisting of

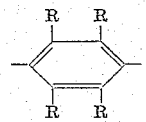

and

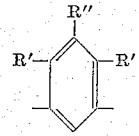

wherein R and R' are lower alkyl and R'' is selected from the group consisting of hydrogen and lower alkyl; and wherein B is a divalent hydrocarbon radical selected from the group consisting of aliphatic, aromatic and aliphatic-aromatic hydrocarbon radicals.

2. The polyamide of claim 1 in which A has the structural formula

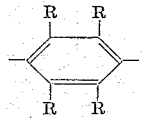

wherein R is lower alkyl.

3. The polyamide of claim 1 in which A has the structural formula

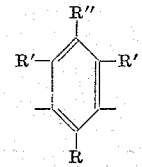

wherein R and R' are lower alkyl and R'' is selected from the group consisting of hydrogen and lower alkyl.

References Cited by the Examiner

UNITED STATES PATENTS 2,806,877   9/57   Koenecke et al. _____ 260—78
2,873,299   2/59   Mikeska _____ 260—78
3,026,302   3/62   Coleman _____ 260—78

FOREIGN PATENTS 627,733   8/49   Great Britain.

WILLIAM H. SHORT, *Primary Examiner.*

MILTON STERMAN, HAROLD N. BURSTEIN,
*Examiners.*